Nov. 16, 1954

E. T. SCOTT
THREAD ROLLING DEVICE HAVING
ADJUSTABLY MATCHED DIE ROLLS
Original Filed May 8, 1952

Re. 23,897

INVENTOR.
Elmer T. Scott
BY
Clayton T. Jenks
ATTORNEY

United States Patent Office

Re. 23,897

Reissued Nov. 16, 1954

23,897

THREAD ROLLING DEVICE HAVING ADJUSTABLY MATCHED DIE ROLLS

Elmer T. Scott, Worcester, Mass., assignor to Reed Rolled Thread Die Company, Holden, Mass., a corporation Original No. 2,679,773, dated June 1, 1954, Serial No. 286,724, May 8, 1952. Application for reissue July 21, 1954, Serial No. 444,934

8 Claims. (Cl. 80—6)

Matter enclosed in heavy brackets [ ] appears in the original patent but forms no part of this reissue specification; matter printed in italics indicates the additions made by reissue.

This invention relates to an improvement in a thread rolling device of the type shown in my prior application, Serial No. 236,541, filed July 13, 1951.

A thread rolling device of this type comprises a plurality of rotatively interconnected die rolls which are freely rotated by a positively rotated work piece, and pressure of the dies against the work serves to force the dies into the work piece and gradually form the threads thereon. The dies are mounted for a relative rotative adjustment so that they may be brought into an exact matching engagement with a thread and be thereafter held in a matched synchronism. The die rolls are rotatively connected by means of two special gears, but for the purpose of matching the threads these gears may be freely moved relative to each other to permit rotating the two die rolls separately into a proper thread matching relation. Thereafter, the two gears are held in an immovable relationship so that the die rolls are forced to roll together.

In my prior construction, one of these gears is made integral with a spindle and the other gear is rotatively mounted on the same spindle and adapted to be moved axially and clamped laterally against the first gear so that they will rotate together after they have been brought into the required matching relationship. To effect that matching operation, the spindle is held by a set screw and the freely rotatable gear, mounted on an extension hub of the spindle, is freed from rotative contact with the spindle gear by loosening a clamp nut. After this the two roll dies and their associated gears may be turned relative to each other until the required matching is effected after which the clamp nut is moved forward to clamp the two gears together. If, however, the operator of the device should forget to loosen the set screw which holds the spindle, then the first attempt at rolling the thread will either strip the face of the work or injure it or break or otherwise damage the threads of the roll dies. Moreover, the rotative effort required to loosen the clamping nut which holds the gears together is likely to twist the spindle relative to the set screw and thus by a camming action set the screw against the spindle and make it difficult to remove it and possibly injure the screw head.

One object of this invention is to provide a construction which will prevent that type of accident and will insure that neither roll or its associated gear can be held locked during use. To this end, I provide a set of wrenches, one of which is inserted within a hole in the other which are so arranged that the operative ends of the two wrenches are axially aligned. One of these ends is arranged to engage a part associated with the spindle while the other wrench engages the clamping nut which normally serves to hold the two gears together. Thus the two parts may be relatively rotated to loosen the gears or to clamp them together.

As a further feature of the invention, if the wrench engaging surfaces were external, an improper use of an incorrect size of adjustable wrench would cause the squared or flat surfaces of the external wrench fitting part to be injured or rounded and later make it difficult to adjust the rolls. Also, any such projection arranged to fit a wrench may extend into the work zone and interfere at times with the use of the thread rolling device.

Hence, a further object of the invention is to have all wrench fitting parts arranged as internal surfaces and without any projecting portions which could be injured or cause inconvenience in the use of the machine or injure the operator.

Another object is to provide a set of tools which will removably serve for freeing the roll driving gears for matching the threads. Other objects will be apparent in the following disclosure.

Referring to the drawings which illustrate this invention as applied to a device of the type shown in my prior application:

The preferred embodiment of my invention, as illustrated, comprises two die rolls 10 and 11 which are respectively rotatably mounted on parallel axles carried on a suitable support, such as the yoke shaped body 12. The die rolls may have threads formed helically on their surfaces in accordance with standard practice, and they are arranged to be thrust directly against the periphery of a positively rotated work piece W and moved laterally thereof until the work piece is substantially diametrically positioned on a line connecting the axes of the die rolls at which time the threads are completed.

Figure 2:
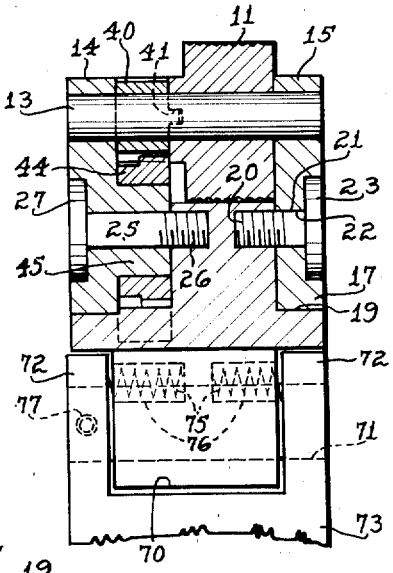
Fig. 2 is a sectional view taken on the line 2—2 of Fig. 1.

In order to provide for adjustability of the die roll positions to accommodate different sizes of work and suitably sized die rolls, each roll axle 13 is pivotally mounted on adjustably movable members, shown as two pairs of swinging arms 14 and 15. The two pivoted arms 14 support one end (the left in Fig. 2) of each die roll axle, and the pivoted arms 15 carry the other end of each axle. The arms 14 and the arms 15 are respectively symmetrical but mounted in a reverse arrangement, so as to hold the roll pins at their outer ends. Each swinging arm has a substantially cylindrical or disk-shaped portion 17 and a laterally projecting die roll supporting projection 18. The cylindrical periphery of the disk-shaped part 17 rotatively bears on a recessed cylindrical bearing 19 formed in the supporting yoke body 12. The right hand arm 15 has a further bearing provided by the T-shaped pivot post 20 which is threaded at its inner end into a hole in the yoke 12. The post has a cylindrical bearing surface 21 pivotally supporting an inner cylindrical surface 22 within the disk 17 of the swinging arm 15. An enlarged or T head 23 fixed to the post 20 is mounted in a cylindrical recess within the disk 17, and it is provided with spanner wrench holes 24 so arranged that the threaded end may be turned into position in the yoke shaped mount 12. These parts are so made that the external cylindrical surface 21 and the internal bearing surface 19 in the yoke 12 both cooperate to support the cylindrical disk 17 for a very accurate rocking movement. The other arm 14 has a similar central post 25 which is longer than the post 20 to provide for a gear assembly, as will be described. This post likewise has a threaded end 26 and the T-shaped cylindrical bearing head 27 riding in a cylindrical depression within the rocking arm 14 and helping to support the arm.

The position of each of the die rolls relative to the work piece W is adjusted by means of an adjustment push screw 30 and a set screw 31 engaging each rocking arm 14 and 15. Each screw 30 passes through the projecting yoke arm of the support 12 and engages the substantially flat face 32 of the adjacent roll supporting swinging arm portion 18. Each set screw 31 is located in a threaded hole near the base of the U-shaped body 12 and arranged to engage a wide angled slot 34 formed in the periphery of the disk 17. The screws 30, 31 and the slots 34 are so arranged that the inner curved end of each set screw may rockingly bear on the adjacent flat wall faces 32 and 34 and cause rocking of the disk 17 and move the associated swinging arm and its end of the die roll towards or from the work axis. Thus, by adjustment of the two screws the two opposite supporting arms 14 and 15 may be manually adjusted inwardly, or outwardly, to the required extent after each set screw 31 has been backed off, and then the latter may be set into position to hold the swinging roll support in a fixed and adjusted position. It will be appreciated that the position of the die roll may thus be very accurately adjusted by careful manipulation of the adjusting screws.

Figure 1:
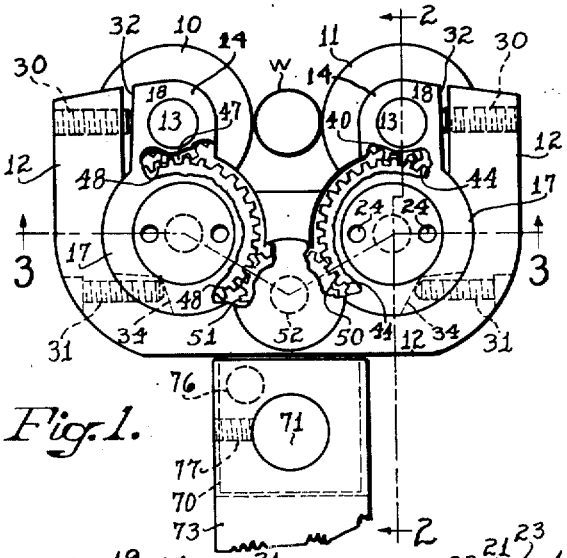
Fig. 1 is a vertical elevation of the roll device which is partly broken away to show the gear connections between the die rolls and the positional adjustments of the rolls.

In this construction, it is required that the two die rolls be rotatively connected to rotate in synchronism. For that purpose, the die rolls are preferably connected by a gear train which provides for a matching of the threads of the die rolls relative to the work. The right hand arm 14 of Fig. 1 is therefore shaped to provide space and a bearing mount for a gear 40 which is secured to the die roll 11 by a key 41 locking between two driving lugs on the near side of the die roll. That gear 40 and the die roll are freely rotatable on the bearing shaft 13 which passes axially through the roll and is fitted within the two opposed rocking arms 14 and 15. The gear 40 meshes with a further gear 44 mounted for free rotation on a cylindrical bearing extension or boss 45 projecting inwardly from the rocking arm 14. The cylindrical bearing portion of the post 25, which helps to support the rocking arm 14, is long enough to pass through that boss and form the pivot for the arm 14. Similarly, the opposed die roll 10 has a gear 47 (left hand portion of Fig. 1) freely rotatable on its shaft 13 and secured to the die roll by a driving key. That gear 47 meshes with a large gear 48 likewise pivotally mounted on its associated bearing surface on the boss 45 of the swinging arm 14.

Figure 3:
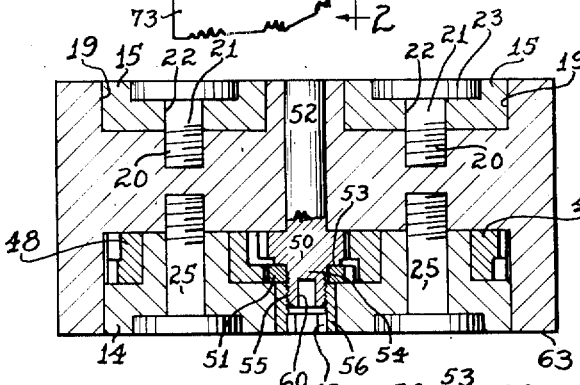
Fig. 3 is a sectional view taken on the line 3—3 of Fig. 1, which is broken away to show details.

Between the two gears 48 and 44 is a gear assembly that connects the die rolls rotatively and yet permits matching adjustment. This comprises two gears 50 and 51 (Fig. 3) which are adapted to be rotated adjustably relative to each other. The gear 50 is integral with a central rotatable shaft 52 which is rotatably mounted in a suitable bearing between the yoke arms of the body 12. This gear meshes with the gear 44 of the right hand die roll 11 of Fig. 1. The other gear 51 meshes with the gear 48 of the left hand driving roll 10, it being noted that these gears 44 and 48 are cut away and inverted in position so that they contact only wtih their associated gears, as illustrated. The gear 51 is freely mounted on a cylindrical bearing extension 54 of the spindle 52. The spindle is threaded at its end 55 for engagement with a nut 56. The top face 53 of the gear 50 (Fig. 3) is flat and may be forced against a correspondingly parallel face on the freely rotatable gear 51 by tightening up on the nut 56. This brings the two gears into a tight frictional engagement so that after an adjustment has been made, they will rotate together.

In accordance with this invention, as shown in Figs. 1 to 4, I provide the end of the spindle 52 with an internal wrench socket 60 and the nut 56 with another internal wrench socket 62. These are preferably hexagonal in shape and made suitably. A wrench key applied to the socket 60 will serve to hold stationary the spindle 52 and its gear while a second wrench applied to the internal surface 62 of the nut 56 will serve to turn the nut 56 relative to the spindle 52 and thus either loosen or tighten the connection between the two parallel friction surfaces of the shoulder 53 and the inner end face of the gear 51. It will be observed that the internal nuts 60 and 62 are located inside of the plane defining the outer face 63 (Fig. 3) of the device. Hence the various gears with the associated spindle are concealed and there is nothing projecting which can in any way interfere with the treatment of the work or the operation of the device.

Figure 4:
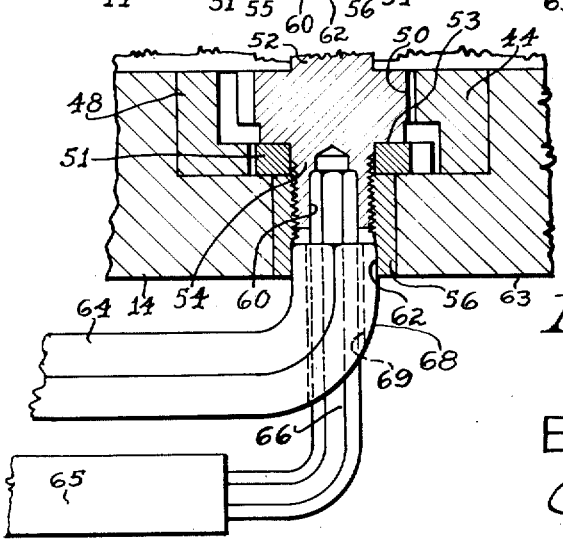
Fig. 4 is an enlarged fragmentary sectional view showing the two interfitted axially aligned wrenches in their operative arrangement for loosening the two interconnecting gears to permit matching of the die rolls.

I have provided a special set of wrenches 64 and 65 adapted to fit into the two sockets 60 and 62 (Fig. 4). One wrench has a hollow shank into which the other wrench interfits axially so that both may be applied to their respective sockets and operated simultaneously. To this end, the L-shaped wrench 65 has a hexagonal socket engaging key 66 at right angles to the handle at the left hand end, and that hexagonal key 66 fits into the internal hexagonal socket recess 60 of the extension 54 of the spindle 52. The other L-shaped wrench 64 has an extension 68 at right angles to the handle portion which also has a hexagonal key at its end that fits properly within the hexagonal socket 62 of the nut 56. To provide for this coaxial assembly of the two wrenches, the portion 68 of the wrench 64 is made considerably larger in diameter than the part 66 of the other wrench, and it is provided with a cylindrical hole 69 co-axial with its socket fitting key portion and so shaped that the part 66 of the wrench 65 may be slid into and freely turned within this hole. Thus the wrench 65, 66 manipulates or holds the internal hexagonal surface 60 of the spindle 52 while the hexagonal portion 68 of the wrench 64 operatively engages the internal surface of the nut 56.

By applying these two wrenches to the two internal sockets as described, the spindle 52 may be held stationary by means of the wrench 65, 66 while the other wrench 64, 68 serves to turn the nut 56 and loosen the frictional engagement between the gear 51 and the shoulder 53 of the spindle 52. This frees the two gears 51 and 50 and permits the die rolls to be manually rotated relatively to provide a proper matching with a thread gauge or a finished work piece. Then by a reverse manipulation of the two wrenches the spindle 52 is again held stationary while the nut 56 is tightened to thrust the gear 51 against the shoulder 53 of the spindle 52 and thus make the two parts rotate in unison. Thus the helical threads of the two die rolls may be brought into a very accurate matching engagement with that gauge by merely rotating one roll relative to the other as permitted by the slippage of the gear 51 relative to the gear 50. Thereafter the nut 56 is tightened to clamp the two gears 50 and 51 together so that they rotate as a unit. Since the two die rolls are correspondingly connected together by the adjusted gear train, they must rotate in synchronism and in the desired matched relationship as provided by slipping the gears 50 and 51. Since the gears 44 and 48 are axially mounted on the pivot of the swinging arm 18, the die roll gears 40 and 47 are always running on the same pitch line of the larger gears 44 and 48 as the arms 18 swing. Thus any swinging adjustment of the arms 18 cannot affect the gearing center line distances but does change the thread matching relationship.

An adapter may be used for mounting the die rolls on a lathe or other machine tool, which is arranged to provide both swinging and axial movement of the die rolls. The yoke body 12 may have a projecting lug or shank 70 pivotally mounted on a pin 71 carried by the yoke arms 72 of the adapter shank 73 which is suitably mounted on the machine tool. This provides for a lateral displacement or swinging of the assembled die rolls relative to a piece of work which is not correctly located axially between the two rolls. Also, a slight clearance is left between the inner faces of the yoke arms 72 of the supporting shank of the adapter and the outer parallel flat sides of the lug 70 of the yoke body 12 so that the yoke body may move endwise on the pivot pin 71. Two coiled springs 75 are mounted in sockets 76 in the outer faces of the shank 70, and they bear against the inner faces of the adapter yoke arms 72 and thus tend to hold the die roll supporting body 12 located centrally within the yoke 73. This axial movement thus provided by the springs 75 will ease any lateral thrust on the flanks of the threads of the die rolls and tend to return the yoke body 12 to a central position when that pressure has been released. This provides an almost universal mount for the die rolls. A set screw or pin 77 will hold the pivot shaft 71 fixed in the yoke 72 so that the die roll body 12 may swing without any movement of the supporting shaft.

It will now be appreciated that this construction provides for full adjustability of the rolls toward and from the work within the capacity of the device and according to the size of the rolls, and this adjustment will not affect the operation of the device. The die roll threads may be readily brought into an accurate thread matching relationship by relative rotation of the frictionally engaged drive gears 50 and 51. Since the four arms 18 carrying the ends of the roll pins or axles 13 are separately movable, each may be independently adjusted by manipulation of its screws 30 and 31. This provides for adjusting or tilting the two roll pins accurately and locking them in axial parallelism with the work, so as to correct for taper within the pin and bearing tolerances. Also, the yielding mount provided by the slight clearance between the shank 73 and the yoke arms 72 and the centering springs 75 (Fig. 2) serves to relieve the side thrust on the die roll threads as work penetration progresses and the apparent work diameter decreases. The pivot pin 71 permits the rolls to float into full contact with the work and compensate for any out of alignment of the work and die rolls. The rolls are usually left freely rotatable, except as they are geared together, and their rotation is effected solely by the rotation of the work piece therebetween.

Figure 5:
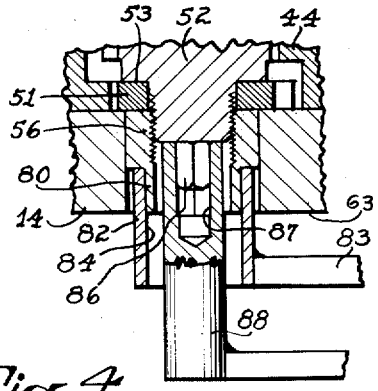
Fig. 5 is a fragmentary view similar to Fig. 4 showing a modification.

As an equivalent construction, the key and the socket for either or both wrenches and the associated gear or clamp nut may be interchanged. For example, as shown in Fig. 5, the clamping nut 56 has a reduced end portion 80 which provides an annular recess between it and the front arm 14 into which the hollow end 82 of a wrench 83 may be inserted. An external surface of the end portion 80 is made hexagonal or of other suitable shape which is adapted to fit a corresponding shape on the internal surface 84 of the wrench 83, so that by means of this wrench the nut 56 may be turned on the threads on the spindle 52 for loosening the gear 51 from frictional engagement with the shoulder 53 on the spindle.

Similarly, the spindle 52 is provided with a reduced end portion 86, the external surface of which is made hexagonal or of other suitable shape for fitting within the socket 87 of corresponding shape which is provided in the end 88 of the second wrench. These two wrench parts 83 and 88 are axially interfitted the same as shown in Fig. 4. In this construction, the internal surface 84 of the wrench 83 is continued as an opening, preferably cylindrical in shape, into which the second wrench 88 fits loosely and within which it may be turned freely. Other arrangements of these parts will be readily suggested by Figs. 4 and 5. That is, either part may be provided with an external key surface, while the other is correspondingly recessed to fit the same. It will also be noted that in the Fig. 5 construction, all of the parts are held within the boundary surface 63 of the yoke body. If desired, the interfitting faces at 53 between the gear 51 and the spindle 52 may be milled to provide very fine teeth or corrugations which prevent slippage, or they may be otherwise made for the purpose.

Various other modifications may be made in this construction by one skilled in the art, and it will be understood that the above description of preferred embodiments is not to be interpreted as imposing limitations on the appended claims.

I claim:

1. A thread rolling device comprising rotatable die rolls having work rolling threads thereon, a support, bearing axles on the support carrying the rolls in axial parallelism, a gear train connected between and synchronizing the rotation of the rolls which includes two axially aligned, relatively rotatable gears having contiguous parallel frictional side faces, each of which is respectively connected to rotate with one of the die rolls, mounts for said gears whereby one gear is axially immovable and the other gear is axially movable for releasably engaging the friction faces in a roll driving relationship, a clamp nut for moving the axially movable gear and a threaded part carrying the nut which is associated with the immovable gear, said nut and immovable gear having concentric wrench engaging faces so arranged that they may be simultaneously engaged by separate wrenches for releasing the clamp nut to provide for relatively rotating the die rolls and adjusting their matching relationship.

2. A thread rolling device according to claim 1 comprising a spindle provided with a threaded end which is integral with and projecting axially from the axially immovable gear, said axially movable gear being rotatively and slidably mounted on the spindle, and the clamp nut being threaded on said threaded end.

3. A thread rolling device according to claim 1 in which said support has an outer face and the clamp nut, the gears and their wrench interfitting parts lie wholly inside of the said surface, so that when the wrenches have been removed there are no projecting portions of the adjustment parts.

*4. A thread rolling device comprising a yoke having a part adapted to be removably mounted on a work rotating machine tool, two die rolls, spindles carrying the rolls, independently movable supports for both ends of each spindle which are movably mounted on the yoke and provide for a tilting adjustment of each end of each spindle, separate adjustment devices on the yoke, each cooperating with a separate spindle support for tilting and moving one end of a spindle so that the relative adjustments of said devices serve to correct for axial parallelism of the rolls and variations in work size, and a gear train on the yoke interconnecting the rolls for free rotation thereof by a positively driven work piece which includes a gear rotatable with the die roll on each spindle and relatively adjustable members in the gear train connected respectively to the two spindle gears and providing for rotating the rolls relatively and holding them in a matching relationship, and means for releasably securing said members in an adjusted relationship.*

*5. A thread rolling device comprising a yoke having a part adapted to be removably mounted on a work rotating machine tool, opposed spindles mounted in axial parallelism on the yoke, freely rotatable die rolls on the spindles mounted to roll a thread on a work piece therebetween, a gear revolvable with the roll on each spindle, and a gear train mounted on the yoke and interconnecting the spindle gears which includes two relatively adjustable friction gears connected respectively to the two gears of the spindles and having contiguous friction faces providing for rotating one die roll relative to the other to match the roll threads with a work piece and releasable means on the yoke for holding said friction faces in an adjusted driving relation so that the die rolls may rotate freely in synchronism and a matched relationship when driven by a positively rotated work piece.*

*6. A thread rolling device comprising a yoke having a shank adapted to be removably mounted on a work rotating machine tool, two opposed pairs of parallel, separately spaced swingable arms, two opposed pairs of pivots on the yoke supporting said arms for independent swinging movement thereof, a die roll spindle mounted on each pair of arms, a freely rotatable die roll carried by each spindle, separate adjustment devices on the yoke contacting and arranged for swinging each arm of a pair independently and securing it in an adjusted position to correct for axial parallelism of the die rolls and variations in work size, said die rolls being mounted on the spindles for rolling a thread on a work piece therebetween, and a gear train interconnecting the die rolls and holding them in a thread matching relationship so that they may be rotated freely by a positively driven work piece.*

*7. A thread rolling device comprising a yoke having a shank adapted to be removably mounted on a work rotating machine tool, two opposed pairs of spaced arms pivoted on the yoke, a die roll spindle mounted near the end of each pair of arms, freely rotatable die rolls on the spindles arranged to roll a thread on a work piece therebetween, separately adjustable threaded members on the yoke contacting with each arm and so arranged that the two arms of a spindle may be separately moved to correct for axial parallelism of the die rolls and variations in work size, a train of gearing interconnecting the rolls including a gear on each spindle which rotates with the associated roll, a gear axially concentric with the pivot of each arm about which the spindle gear rolls and two relatively adjustable driving members which may be relatively moved for rotating one die roll relative to the other, and a clamping device for securing said members in an adjusted relationship so that the rolls may rotate freely in synchronism and a thread matching relationship for any position of each die roll spindle.*

*8. A thread rolling device comprising a yoke arranged to be removably mounted on a work rotating machine tool, independently movable pairs of spaced swinging arms, a pair of pivots on opposite sides of the yoke carrying and providing for independent movement of the swinging arms, a spindle carried by each pair of arms, and spaced from the arm pivots for swinging thereabout a rotatable die roll on each spindle, a boss on each arm on one side of the yoke which is concentric with the arm pivot, and gearing interconnecting the die rolls including a gear on each spindle connected to rotate with the associated die roll and a gear rotatably mounted on each boss which meshes with the gear on the associated spindle and provides for the spindle gear rolling about the boss gear as the spindle is swung and permits free rotation of the gears in synchronism so that swinging the*

*arms does not affect the accuracy of gear mesh and the die roll matching relationship.*

References Cited in the file of this patent or the original patent

UNITED STATES PATENTS

| Number | Name | Date |
|---|---|---|
| 1,496,116 | Browne | June 3, 1924 |
| 2,599,489 | Schmidt | June 3, 1952 |

| Number |
|---|
| 317,421 |
| 549,838 |
| 580,949 |

FOREIGN PATENTS

| Country | Date |
|---|---|
| Italy | May 8, 1934 |
| Germany | May 2, 1932 |
| Great Britain | Sept. 25, 1946 |